US 8,128,487 B2

(12) United States Patent
Hamilton, II et al.

(10) Patent No.: US 8,128,487 B2
(45) Date of Patent: Mar. 6, 2012

(54) COMPENSATING PARTICIPANTS OF VIRTUAL ENVIRONMENTS

(75) Inventors: Rick A. Hamilton, II, Charlottesville, VA (US); Robert A. Hood, Boca Raton, FL (US); Robert C. McGinley, Olympia, WA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 11/872,597

(22) Filed: Oct. 15, 2007

(65) Prior Publication Data

US 2009/0098939 A1  Apr. 16, 2009

(51) Int. Cl.
*A63F 13/12* (2006.01)
(52) U.S. Cl. ............... 463/25; 463/23; 463/29; 463/30; 463/42; 273/138.1; 273/39; 705/14.12; 705/17; 705/39
(58) Field of Classification Search .............. 463/16–23, 463/25–30, 39–43, 45, 47; 273/138.1, 138.2, 273/139, 141 A, 454–456, 460; 705/14.12, 705/17, 39, 44; 709/203–207; 713/1, 100, 713/150, 182, 187, 189–190; *A63F 13/12*
See application file for complete search history.

(56) References Cited

U.S. PATENT DOCUMENTS

| 5,983,003 | A * | 11/1999 | Lection et al. ............... 709/202 |
| 6,293,865 | B1 * | 9/2001 | Kelly et al. ................... 463/16 |
| 7,192,352 | B2 * | 3/2007 | Walker et al. ................. 463/42 |
| 7,314,411 | B2 * | 1/2008 | Lannert et al. ................ 463/19 |
| 7,527,191 | B2 * | 5/2009 | Takayama et al. ............ 235/379 |
| 7,770,114 | B2 * | 8/2010 | Sriprakash et al. .......... 715/706 |
| 7,780,525 | B2 * | 8/2010 | Walker et al. ................. 463/29 |
| 7,865,393 | B2 * | 1/2011 | Leason et al. ............. 705/14.14 |
| 7,955,171 | B2 * | 6/2011 | Jorasch et al. ................ 463/20 |
| 7,985,132 | B2 * | 7/2011 | Walker et al. ................. 463/23 |
| 2002/0026388 | A1 | 2/2002 | Roebuck |
| 2003/0032476 | A1 * | 2/2003 | Walker et al. ................. 463/25 |
| 2004/0127277 | A1 * | 7/2004 | Walker et al. ................. 463/16 |
| 2005/0216346 | A1 * | 9/2005 | Kusumoto et al. ............ 705/14 |
| 2005/0277472 | A1 * | 12/2005 | Gillan et al. .................. 463/42 |
| 2006/0003305 | A1 * | 1/2006 | Kelmar .......................... 434/350 |
| 2006/0128460 | A1 * | 6/2006 | Muir et al. ..................... 463/16 |

(Continued)

OTHER PUBLICATIONS

HighBeam Research, Interactive Solutions(TM) Corporation and BestBetTV.com Announce Strategic Non-Wagering 'Play-for-Fun' Gaming Alliance, Nov. 10, 2001, PR Newswire Association LLC, p. 1-2.*

(Continued)

*Primary Examiner* — Arthur O. Hall
(74) *Attorney, Agent, or Firm* — Schubert Law Group PLLC; Mark C. Vallone (57) ABSTRACT

Methods, systems, and computer program products for compensating participants of events or activities of virtual environments, such as on-line games, digital or virtual worlds, and virtual universes are disclosed. One or more embodiments may comprise conducting an event, measuring event participation by the participant, and compensating the participant based upon the measured participation. Various embodiments may compensate the participant based upon the amount of time the participant spends at the event, while other embodiments may compensate the participant based upon amounts or types of activity of the participant while attending the event. Some embodiments may compensate the participant based upon such activity as chat activity, keyboard activity, and mouse activity. Some embodiments may compensate the participant based upon one or more referrals that the participant makes other participants.

20 Claims, 5 Drawing Sheets

U.S. PATENT DOCUMENTS

| | | | | |
|---|---|---|---|---|
| 2006/0252526 | A1* | 11/2006 | Walker et al. | 463/29 |
| 2007/0066403 | A1* | 3/2007 | Conkwright | 463/43 |
| 2007/0073582 | A1 | 3/2007 | Jung et al. | |
| 2007/0106526 | A1* | 5/2007 | Jung et al. | 705/1 |
| 2007/0112624 | A1 | 5/2007 | Jung et al. | |
| 2007/0117623 | A1* | 5/2007 | Nelson et al. | 463/29 |
| 2007/0130001 | A1 | 6/2007 | Jung et al. | |
| 2007/0298867 | A1* | 12/2007 | Huang | 463/25 |
| 2008/0064467 | A1* | 3/2008 | Reiner | 463/16 |
| 2008/0155019 | A1* | 6/2008 | Wallace et al. | 709/204 |
| 2008/0176655 | A1* | 7/2008 | James et al. | 463/42 |
| 2008/0207329 | A1* | 8/2008 | Wallace et al. | 463/42 |
| 2008/0254893 | A1* | 10/2008 | Patel et al. | 463/42 |

OTHER PUBLICATIONS

"Universally Unique Identifier", 2006 (http://en.wikipedia.org/wiki/UUID).

* cited by examiner

FIG. 4

COMPENSATING PARTICIPANTS OF VIRTUAL ENVIRONMENTS

FIELD

The present invention generally relates to the fields of virtual environments and virtual worlds. More particularly, the present invention relates to systems, methods, and computer program products for compensating individuals that participate in activities or events of virtual environments.

BACKGROUND

Using a technology referred to as virtual technology, computers have the ability to let people interact with one another in computer-simulated environments. Computers render three-dimensional shapes of real world objects in these virtual environments. For example, with the aid of some type of display, computers produce images that have three-dimensional characteristics of buildings, cars, animals, and even people.

Due to wants and demands of on-line consumers some companies have begun offering entertainment, usually in the form of games within virtual environments and virtual universes, alternatively referred to as digital worlds or metaverses. In these virtual universes people may be graphically rendered as game-like three-dimensional images called avatars. These avatar characters usually represent residents of the virtual environment. Residents, or more precisely real-world users that manipulate the on-line residents, may own virtual property, hold virtual business meetings, buy and sell virtual goods and services, and take part in virtual activities like dancing, watching a movie, playing a game, and meeting other people.

Similar to the manner in which our world may be divided into different geographical areas, or regions, virtual environments may also be divided into different regions. For example, a region may consist of a virtual area of land within a virtual universe. The computer code used to generate this region may reside on a server connected to the Internet, to which participants of the virtual universe log onto in order to access.

Due to the increased popularity of these games and virtual environments, many companies are paying for virtual advertising space that real-world consumers see as they participate in the virtual environments. In a virtual environment, a crowded region is usually a sign of popularity and interest. Crowded regions tend to draw more attention than sparsely populated regions. This attention and popularity has value because it can increase the visibility of a theme or branding of a particular region. Advertisers need viewers, and one way to increase viewers in a virtual environment is to attract a crowd.

One way of attracting a crowd is to offer payment as an incentive, in the form of virtual universe money ($VU), to remain or camp in a particular region. While the value of units of currency tends to differ for the different on-line games and virtual environments, a $VU is generally a conversion of real tender into VU money. For example, one dollar of United States currency may represent one hundred dollars $VU. Offering payment to other participants for their participation in an on-line activity is commonly referred to as an event. In other words, events may represent gatherings of avatars for a particular occasion, which may include a reward for participation of the event. In order for a participant to be eligible for a reward, the participant must usually maneuver his or her avatar within a certain distance, or range, of the event.

Current games and virtual environments pay participants or avatars within range of an event a flat fee regardless of any actions taken by the individual to aid in advertising or promoting the region. For example, an avatar who is assisting others, chatting, and bringing new viewers to the region is compensated exactly the same as someone who places their avatar in a region and does nothing. This imbalance takes away from the overall effectiveness of the incentive program and advertising effectiveness. The value of an active participant who engages others in the community and takes part in the event is generally much greater than the value of an inactive camper, but such active participation is not recognized or rewarded.

SUMMARY

In embodiments, there is provided a method that includes a computer conducting a plurality of games within a virtual environment. The method further includes a computer measuring at least one factor of a plurality of factors of participation in a virtual game of the plurality of virtual games by a participant of the virtual environment controlling a virtual game player avatar graphically displayed in a human form in the virtual environment. The plurality of factors include a virtual distance that the virtual game player avatar is to a location of the virtual game in the virtual environment, an amount of time that the virtual game player avatar spends at the virtual game, an amount of time that the participant spends away from a keyboard of the participant during the virtual game, a number of referrals made by the participant that result in another participant of the virtual environment participating in the virtual game, a number of acceptances of offers made by the participant to teleport a virtual game player avatar controlled by another participant of the virtual environment to the virtual game, and an amount of time spent in chat activity by the participant during the virtual game. The method further includes the computer calculating an amount of virtual money to transfer from a virtual account in the virtual environment belonging to a creator of the virtual game to a virtual account in the virtual environment belonging to the participant based upon the measured at least one factor.

In other embodiments, there is provided a computer system that includes a processor, a computer-readable memory, and a computer-readable tangible storage device. The computer system further includes program instructions, stored on the computer-readable tangible storage device for execution by the processor via the computer-readable memory, to conduct a plurality of virtual games within a virtual environment. The computer system further includes program instructions, stored on the computer-readable tangible storage device for execution by the processor via the computer-readable memory, to measure at least one factor of a plurality of factors of participation in a virtual game of the plurality of virtual games by a participant of the virtual environment controlling a virtual game player avatar graphically displayed in a human form in the virtual environment. The plurality of factors include a virtual distance that the virtual game player avatar is to a location of the virtual game in the virtual environment, an amount of time that the virtual game player avatar spends at the virtual game, an amount of time that the participant spends away from a keyboard of the participant during the virtual game, a number of referrals made by the participant that result in another participant of the virtual environment participating in the virtual game, a number of acceptances of offers made by the participant to teleport a virtual game player avatar controlled by another participant of the virtual environment to the virtual game, and an amount of time spent in chat activity by the participant during the virtual game. The computer system further includes program instructions, stored on the computer-readable tangible storage device for execution by the processor via the computer-readable memory, to calculate an amount of virtual money to transfer from a virtual account in the virtual environment belonging to a creator of the virtual game to a virtual account in the virtual environment belonging to the participant based upon the measured at least one factor.

In other embodiments, there is provided a computer program product that includes a computer-readable tangible storage device. The computer program product further includes program instructions, stored on the computer-readable tangible storage device, to conduct a plurality of virtual games within a virtual environment. The computer program product further includes program instructions, stored on the computer-readable tangible storage device, to measure at least one factor of a plurality of factors of participation in a virtual game of the plurality of virtual games by a participant of the virtual environment controlling a virtual game player avatar graphically displayed in a human form in the virtual environment. The plurality of factors include a virtual distance that the virtual game player avatar is to a location of the virtual game in the virtual environment, an amount of time that the virtual game player avatar spends at the virtual game, an amount of time that the participant spends away from a keyboard of the participant during the virtual game, a number of referrals made by the participant that result in another participant of the virtual environment participating in the virtual game, a number of acceptances of offers made by the participant to teleport a virtual game player avatar controlled by another participant of the virtual environment to the virtual game, and an amount of time spent in chat activity by the participant during the virtual game. The computer program product further includes program instructions, stored on the computer-readable tangible storage device, to calculate an amount of virtual money to transfer from a virtual account in the virtual environment belonging to a creator of the virtual game to a virtual account in the virtual environment belonging to the participant based upon the measured at least one factor.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

The present invention relates to systems, methods, and computer program products for compensating participants of events or activities of virtual environments, such as on-line games, digital or virtual worlds, and virtual universes. Some embodiments comprise a method for compensating a participant of a virtual environment that involves conducting an event, measuring event participation by the participant, and compensating the participant based upon the measured participation. Alternative embodiments include defining the amount of the compensation, such as how much compensation the participant will receive in response to different types of activities in which the participant may engage. Various embodiments may compensate the participant based upon the amount of time the participant spends at the event, while other embodiments may compensate the participant based upon amounts or types of activity of the participant while attending the event. Some embodiments may compensate the participant based upon such activity as chat activity, keyboard activity, and mouse activity. Some embodiments may compensate the participant based upon one or more referrals that the participant makes other participants.

One or more embodiments may comprise a system having an environment module to conduct the event for the virtual environment, a participation module to measure participation of participants, and a compensation module to calculate compensation amounts for the participants, wherein the compensation amounts depend on the amounts of participation the participants. Some embodiments may comprise a server having a processor, memory, and a display, wherein the server hosts the event via a communication network with a plurality of client computing apparatuses in at least one of embodiments. In numerous embodiments, the event may be a party of a virtual nightclub, a virtual fashion show, a virtual game, a meeting of avatars, a shopping activity of a virtual mall, or viewing a virtual movie.

In some system embodiments, the environment module may be configured to end the event based on an amount of virtual money designated by a creator of the event, an amount of time designated for the event, or a combination of the amount of virtual money and the amount of time designated. In some embodiments, the participation module may measure participation by measuring how close a participant is to the event, the amount of time the participant spends for the event, the amount of time that the participant spends away from his or her keyboard during the event, how many referrals the participant makes, how many teleports the participant generates, or the amount of chat activity by the participant. In one or more embodiments, the participation module may calculate part of the compensation amount for one or more participants based upon a manual designation by the creator of the event. In at least one embodiment, the compensation module may calculate the compensation amount of one or more participants by multiplying the amounts of time the participants spend attending the events by base earning rates.

One or more embodiments may also comprise a computer program product that includes computer usable program code for compensating participants of an event, including code for conducting the event via a virtual environment, code for measuring participation by a participant of the event, and code for calculating an amount of compensation for the participant based upon the measured participation. An embodiment may also include code for creating the event, which may include specifying that the event will conclude upon an expiration of an amount of time or conclude upon a depletion of a quantity of funds. One or more embodiments may also include code for transferring virtual funds from a creator account to a participant account.

In various embodiments, the computer usable program code for conducting the event via a virtual environment may include code for conducting the event for a region of a virtual world. Of these various embodiments, some may include code for calculating the amount of compensation based upon a virtual distance of the participant from the event by using coordinates of a virtual map for the region. In various embodiments, the measured participation may be based upon an amount of time the participant spends at the event, activity of the participant while attending the event, whether the participant refers one or more other people to the event, and whether actions of the participant induce others to teleport to the event. Even further embodiments may include code for calculating compensation that includes adding a manual award to the amount of compensation.

Many of the discussions of the various embodiments employ the term "user". Worth emphasizing is the fact that while a "user" may, in some instances, refer to a real-world person that participates in an event of a virtual environment, the term may also refer to a virtual character of the virtual environment. An embodiment may also employ such terms "avatar", "resident", "participant", and "event participant". In many instances, the terms may be interchangeable. Even further, one or more of the terms may be used in singular form in the discussion and yet actually referred to a plurality of people or characters. For example, a single avatar may belong to multiple real-world people. Alternatively, a single person may control and manipulate multiple avatars.

Some of the discussions use the terms "server" and "client". The term "server" may refer to a computer or device on a network that manages network resources. Clients may generally be thought of as computer applications running on computer systems that access the services provided by server applications and dedicated server computers. However, in several instances in the discussion these terms are interchangeable. Accordingly, one should not conclude that a discussion that uses only "client" or "server" terms, as opposed to using "computer" or "computer systems" terms, is meant to limit the discussion to one term or the other. One of ordinary skill in the art will recognize that such variations may be substituted for the described methods and systems, and employed in accordance with similar constraints, to perform substantially equivalent functions.

Figure 1:
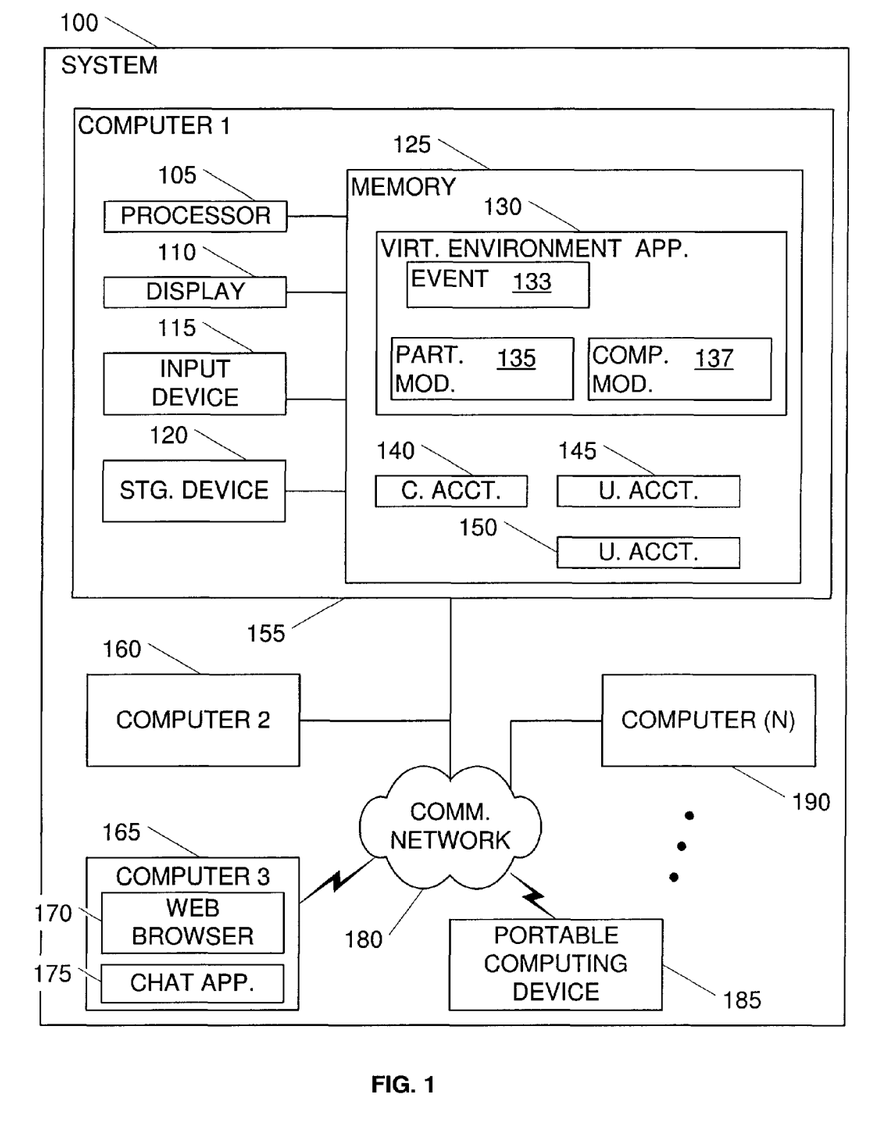
FIG. 1 depicts a system for compensating participants of a virtual environment.

Turning to the drawings, FIG. 1 illustrates a system 100 which may comprise several different computers and devices involved with a virtual environment. For example, computer 155 may comprise a server running a virtual environment application 130. In some embodiments, virtual environment application 130 may comprise a virtual reality game in which two or more real-world people, which may potentially include thousands of real-world people, participate in various virtual reality activities, such as event 133. A virtual reality game is only one example. Virtual environment application 130 may comprise one or more other types of applications that have virtual environments, such as on-line environments for betting on real-world sporting events, gambling, a virtual classroom for teaching students real-world subjects, or a virtual business meeting or business conference. As one may appreciate, virtual environment application 130 may represent an almost endless number of applications that create virtual environments where people may virtually congregate, or otherwise associate with each other.

In one or more embodiments, a system may have a processor, such as processor 105, for executing program instructions for different types of applications, such as virtual environment application 130, which may be in memory 125. Using a virtual environment application like virtual environment application 130, a user of the system may create event 133 in hopes of attracting participants of the virtual environment. Stated differently, processor 105 may execute instructions of computer usable program code that creates a virtual environment for numerous people engaged in an event of the environment. Additionally, processor 105 may execute instructions of different modules of virtual environment application, such as participation module 135 and compensation module 137, as well as execute instructions of other applications that may reside in memory 125.

A system may render shapes, characters, and other elements of a virtual environment application on a monitor or other computer display, such as display 110. For example, display 110 may allow the event creator to monitor the activities for event 133 as they occur. Alternatively, display 110 may also allow the creator to participate in event 133 along with the other participants, displaying the rendered shapes, characters, and other elements of the virtual environment. The event creator may enter various parameters for event 133 using an input device 115. For example, input device 115 may comprise a keyboard and/or a mouse. The creator may utilize input device 115 to create event 133 by entering various parameters, such as when event 133 should begin, when event 133 should end, activities for the event, how participants of event 133 should be compensated, etc. In different embodiments, input device 115 may vary. For example, in some embodiments input device 115 may comprise a tablet and stylus, such as a pressure-sensitive surface of a personal digital assistant (PDA) that recognizes hand-written characters. In further embodiments input device 115 may comprise an audible input device, such as a microphone used for speech recognition.

System 100 may create a virtual environment for numerous residents of the environment over a network having many interconnected computing devices. For example computer 155 may comprise a desktop or laptop computer connected to a number of other computers, such as computer 160, computer 165, and computer 190, and may include portable computing devices such as portable computing device 185. The types of devices that may connect to a computer running a virtual environment application may vary from one embodiment to the next. For example, portable computing device 185 may comprise one of a variety of different devices, such as a Palm® hand-held computer or a Windows Mobile® PDA device as a couple of examples. Depending on the embodiment, the computers of a system may run various types of operating systems. For example, computers 155, 160, and 165 may run Unix®, Microsoft® Windows®, OS/2®, Linux®, DOS, or Mac OS®. Each computer may run the same operating system as the others or a different one.

The other computers of a system may also comprise different types of computing devices. For example, one or more computers like computer 160 or computer 190 may comprise desktop or laptop computers. Additionally, in different embodiments, the computers of a system may comprise a mixture of server and client computing devices. For example, computer 155 may comprise a server running virtual environment application 130 that users of client computers, such as computers 160, 165, 185, and 190, may access. In other words, users of computers 160, 165, 185, and 190 may interact with each other in a virtual environment created by virtual environment application 130 running within a client-server system, which may comprise a system similar to system 100. Users of the different computers and computing devices in an embodiment may participate in one or more events of a virtual environment created by virtual environment application 130.

The computers of a system, such as system 100, may connect to other computers of the system using a variety of different hardware in various embodiments. For example, computer 160 may comprise a desktop computer connected to computer 155 via an Ethernet cable coupled to a local or wide area network (LAN or WAN). Portable computing device 185 may comprise a combination cellular telephone/PDA device coupled to computer 155 over the Internet, which may be represented by communication network 180, via a wireless virtual private network (VPN) link and located across town or in another country. In other words, various embodiments of a system like system 100 may comprise an almost limitless number of wired and wireless communication devices, allowing computers and portable devices of the system to communicate with each other and allow respective users of those computers and portable devices to participate in events of the virtual environment, wherein the computers may be located close to or remote from each other.

The computers and other devices of a system may each execute a variety of different applications and allow users of the devices to communicate with each other in a variety of different ways. For example, in addition to virtual environment application 130 computer 155 may run other types of applications, which may be text messaging or chat applications, virus scanning applications, log-in and security verification applications, and other types of applications. Virtual environment application 130 may work in conjunction with a banking or account management application, used to transfer funds between different accounts of users of system 100. For example, a user of computer 155 may create or set up event 133 in a virtual environment. The event creator may set aside $100 in creator account 140 for event 133. Based on the participation of various participants to event 133, which may be measured via participation module 135, the account management application may transfer a portion or all of the $100 from creator account 140 into user accounts 145 and 150. For example, user account 145 may represent an account for the user of computer 190 and user account 150 may represent an account for the user of computer 165. The compensation module 137 may calculate a reward for a user, based on the level or amount of his participation for event 133, and transfer an amount corresponding to the size of the reward from creator account 140 to the account of the user, which may be user account 150.

Creator account 140 and user accounts 145 and 150 may represent virtual accounts but may also represent real-world money as well. For example, while users of computer systems coupled to computer 155 play in the on-line virtual environment, the funds in the accounts may be represented by units of virtual universe money ($VU). However, when a user wants to cash in some of the money that the user earned while playing the virtual game a banking or account management application of computer 155 may interact with a computer that maintains information of a real-world bank account of the user and convert units of the virtual universe money into units of actual currency.

The type of event that a creator conducts may vary from embodiment to embodiment, as well as within the same embodiment. In other words, the creator may create a variety of different events in a single embodiment as well as create a variety of different events in multiple environments. For example, an event of the virtual environment may comprise a dance or a party at a virtual light club, an exhibit of the latest fashions at a virtual fashion show, a virtual game, a gathering or meeting of avatars, shopping in a virtual mall, or viewing a virtual movie. The types of activities, the durations of the events, and the number of participants may vary from event to event. For example, sometimes the creator will specify that an event may only last for three hours, while at other times the creator may specify that an event may last for a week or longer. Alternatively, the creator may only want to permit a maximum number of participants, such as only ten participants, to participate in some types of events and yet have as many participants as possible participate in other types of events.

The applications of computers in a system, may communicate with each other using a variety of communication protocols. For example, the user of computer 165 may be one of numerous participants for event 133 in the virtual environment created by virtual environment application 130. The user of computer 165 may participate in the virtual environment using a Web browser 170 and a chat application 175. Virtual environment application 130 may use one or more protocols, such as Hyper Text Transfer Protocol (HTTP), to create or present the virtual environment and its activities to the user via web browser 170. Web browser 170 may also interact with the virtual environment application 130 using HTTP, allowing the user of computer 165 to move around in the virtual environment, participate in virtual activities and events, and communicate with other residents. The user of computer 165 may communicate with one or more other participants of event 133 using chat application 175. For example, during the course of event 133 the user of computer 165 may use chat application 175 to communicate with five other participants which may comprise users of portable computing device 185 through computer 190. Chat application 175 may comprise, as an example, an instant messaging application or other type of application that uses one or more communication protocols, such as Internet relay chat (IRC) via transmission control protocol/Internet protocol (TCP/IP) and optionally include transport layer security (TLS) or secure sockets layer (SSL) security.

Parameters, data, and other information of event 133 and virtual environment application 130 may be stored in a storage device 120. For example, storage device 120 may store beginning and ending times of event 133, the names of residents or users who participated in event 133, the amounts of their calculated compensation, the balances of various accounts, etc. In one or more embodiments, storage device 120 may comprise a mass storage device. For example storage device 120 may comprise a parallel or serial hard disk drive. Storage device 120 may also comprise an optical storage device, such as a rewritable compact disc (CD) or a digital versatile disc (DVD) drive. In other embodiments, storage device 120 may comprise a flash memory device, such as a universal serial bus (USB) thumb drive. In even further embodiments, storage device 120 may comprise another type of storage device, such as a redundant array of independent drives (RAID) array.

While the preceding example discussed a system 100 employing local memory 125 and a local storage device 120, alternative embodiments may comprise a system executing or accessing virtual environment programs and other types of programs located in remote locations. For example, virtual environment application 130 may actually comprise two or programs, such as one on a local client system and another on a remote server system. The local client program may be a web browser running a Java application for a web page interacting with a virtual environment application. The web page may have been downloaded from a remote server system running the virtual environment application. A user of the client system may create the event, such as event 133, using one of a variety of different computers connected to the computer running virtual environment application 130. For example, a user of portable computing device 185 or a user of computer 160 may create event 133, whereupon an environment module, a participation module, a compensation module, and other modules on a remote computer like computer 155 actually conduct or host the event for other participants. As a person skilled in the art will quickly appreciate, system 100 may comprise numerous communication and networking configurations, with almost unlimited combinations of local and remote virtual environment applications.

Figure 2:
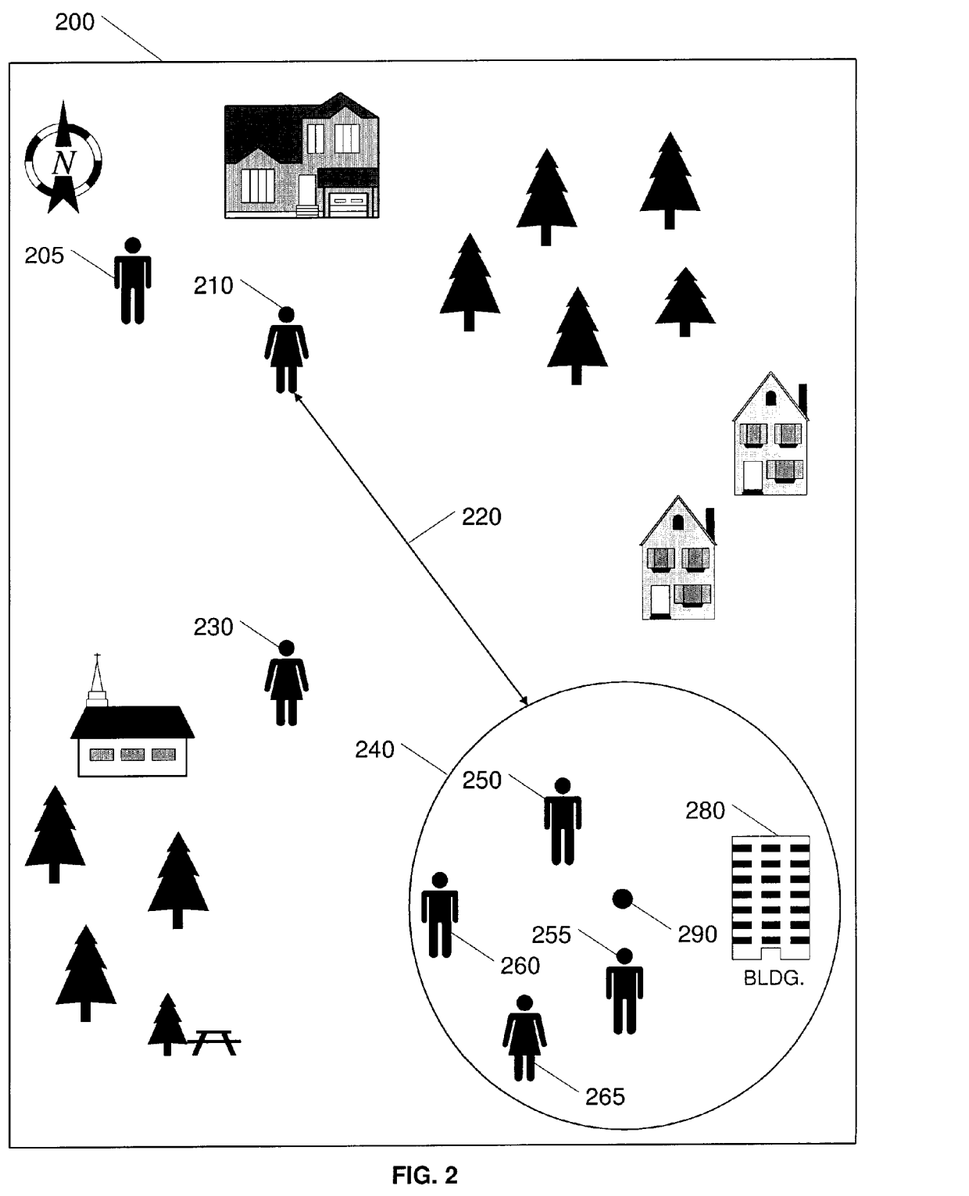
FIG. 2 depicts an embodiment of a virtual environment screen that a participant of a virtual environment may see when participating in an event.

FIG. 2 depicts one embodiment of a virtual environment screen 200 that a participant of the virtual environment may see when participating in an event. For example, a user of computer 190 in FIG. 1 may see a screen similar to screen 200 when the user accesses the virtual environment created by virtual environment application 130. In other words, screen 200 may be a graphical representation or a virtual map of a region in a virtual world or other type of virtual environment. As depicted in FIG. 2, a region may have numerous virtual elements such as houses, trees, and buildings. One should note that FIG. 2 depicts an embodiment of a two-dimensional virtual environment. Other embodiments may have three-dimensional virtual environments. For example, while the houses and other objects depicted in FIG. 2 are shown as flat two-dimensional shapes, the objects rendered in a three-dimensional version may be shown in a three-dimensional perspective with the objects showing surface curvatures and shadowing effects, similar to a three-dimensional action video game.

A user or resident of a virtual environment may want to host an event to attract other residents or users of the virtual environment. For example, the user may be a region owner for the region depicted in screen 200. That is to say, the user may have purchased the virtual real estate of the area or at least part of the area and constructed one or more buildings in the region such as building 280. The region owner may desire to create an incentive event to draw a crowd of other residents to increase visibility of a theme or branding of the region. For example, the region owner may be a real-world product manufacturer trying to advertise a new real-world product. By advertising the product in the virtual environment, the region owner may entice people into buying the product in the real world. To effectively advertise the new product the region owner may need viewers. One way to attract viewers in a virtual environment or virtual universe is to attract a crowd. The region owner may attract a crowd by offering a payment as an incentive to other residents.

The region owner may offer payment as an incentive to other residents in order to have the residents remain or camp in the region. For example, the region owner may designate location 290 as the location for the event. The region owner may desire to compensate residents of the virtual environment that are within range 240 of the event. In other words, the region owner may desire to compensate the users of avatars 250, 255, 260, and 265 which are within range 240, but not compensate other users like those of avatars 205, 210, and 230. For example, the virtual environment application may not compensate the user of avatar 210 since the avatar is located some distance 220 from range 240, wherein distance 220 may be calculated using coordinates of avatar 210 and location 290.

The region owner may choose from a variety of event types to compensate participants of the event. The first event type may comprise setting aside or reserving a limited amount of funds, such as a certain quantity of virtual unit dollars ($VU) to be distributed. In other words, the incentive event may end when the funds are depleted. When a region owner creates the event, the funds may be withdrawn from the account of the region owner at that time. For example, the predetermined amount of funds may be withdrawn out of creator account 140, shown in FIG. 1, and temporarily placed into a holding account until the rewards are calculated and transferred into the accounts of the participants. For this first event type the region owner may choose to end the event at any time and have remaining funds returned into the account of the region owner. Alternatively, the incentive event can be extended by adding or setting aside more funds. For example, the region owner may have anticipated only a limited reaction by only a few participants. However, the event may have attracted substantially more participants than originally anticipated, whereupon the region owner may extend the duration of the event by setting aside more funds.

A second type of event may comprise selecting a fixed time limit, or expiration date, for the event. In other words, the event may be forced to end when the time set for the event expires. For this type of event, funds may be withdrawn from the account of the region owner and transferred into the accounts of the respective participants whenever the calculated compensation becomes due. If funds are not available in the account of the region owner, the event may end in one or more embodiments. Alternatively, in some embodiments, the region owner may be given the option of extending the event by adding more funds into the account. For example, virtual environment application 130 may send a notice to the region owner informing her about the lack of funds, after or shortly before the funds are depleted, and give the region owner the option of depositing more funds into the account. In one or more embodiments, the region owner may also extend or shorten the time that the incentive event ends by changing the expiration date.

A third type of event may comprise a combination of a fixed time and a fixed fund event. For this third type of event, the event may end whenever the fixed funds set aside for the event are expended or whenever the fixed time set for the event arrives, whichever comes first. Upon creation of the event, the funds may be withdrawn from the account of the region owner. Depending on the embodiment, the region owner may be able to terminate the event before the time set for the expiration of the event arrives. In other words, some embodiments may allow the region owner to terminate the event early. Upon terminating the event, any remaining funds may be deposited back into the account of the region owner. Various alternative embodiments may allow the region owner to extend or shorten the duration of the event by adding funds to or subtracting funds from the event funds. Additionally, the region owner may extend or shorten the duration of the event by altering the expiration date or time.

In some embodiments, the earning rates may be defined or set as fixed earning rates. That is to say, embodiments compensating participants using fixed rates may reward some participants equally, regardless of the amount or type of their contributions. Alternatively, or in addition to employing fixed rate compensation, embodiments may also define variable earning rates to compensate participants. With variable rates, the amount that a participant earns may depend on one or more measured factors or measured participation. One factor or measure of participation may be the amount of time the participant spends at an event. For example, referring to FIG.

2 the participant of avatar 255 may spend an hour at the event and receive twice the reward that the participant of avatar 260, because the participant of avatar 260 may have only recently arrived at the event. Another factor or measurement may be the amount of time the participant remains active at the event. For example, a participant who has not been away from keyboard (AFK) for an hour while attending the event may have a different earning rate than a participant who has been AFK twice in an hour. Such activity may be measured by monitoring the keyboard activity related to, as an example, chatting with other participants at the event, pressing keys of a keyboard, or movement of a mouse.

A further factor that may affect compensation may be the number of referrals attributed to a participant. For example, a participant who brings five individuals to an event or otherwise causes the individuals to participate in the event, may be entitled to one amount of compensation, which may be greater than the amount of another participant who brings only two individuals to the event. Measurement of such referrals may be measured in a variety of different ways in one or more embodiments, such as by those referred individuals mentioning the name of the referrer when arriving at the event. One or more embodiments may also factor the number of teleports offered and accepted. For example, a participant who provides a teleport location for a friend, who then joins the event, may receive an increase in earning rate.

Yet another factor alluded to before may be chat activity. An individual or participant who chats a certain number of times at an event may receive an increased earning rate. In other words, two participants who both remain at the event for an hour and are both not away from their keyboard during that time may nonetheless receive different earning rates due to different amounts of chat activity. An even further factor may comprise a manual setting by the region owner. That is to say, a region owner, or a designated representative, may manually alter the earning rate for a individual or group of individuals participating in the event. For example, the region owner may want to increase the earning rate of a participant who goes out of her way to assist others and makes suggestions about improving the design of the region. The region owner may compensate this participant by manually setting her earning rate, or manually setting a portion of her earning rate.

The earning rate may be computed using a base earning amount, or a base earning rate, for an event. A base earning rate may comprise multiplying a value of time by a monetary unit value, such as a $VU. For example, an incentive program for an event may comprise an initial earning rate of 5 $VU per hour. For every hour a participant spends at the event, the participant may receive 5 $VU.

Different levels of earning rates may provide different compensation values. Such levels of earning rates may be calculated using an additional percentage of the base earning rate, in addition to the base rate. In other words, the percentage may represent an amount of the base rate to reward in addition to the base rate. For example, an event may have a 5 $VU per hour earning rate. The event may also have an additional earning rate level of 50% for participating more than 2 hours. A participant who stays at the event for three hours may receive 5 $VU for the first hour. If the participant stays longer, the participant may receive 5 $VU for the second hour after 120 minutes, and 7.50 $VU (5+(5×50%)) for the third hour for a total of 17.50 $VU in reward compensation.

The different levels of earning rates may be selected according to numerous triggering events or triggers. For example, a participant may receive a particular earning rate based on membership of a particular group or organization. The participant may receive a particular earning rate based on event participation and contribution time. The participant may also receive a particular earning rate based on the number of referrals or other types of activities which increase participation by other individuals. These triggers are only some examples. Other triggers may likewise be used in one or more embodiments.

A region owner, or a designated representative, may also employ fixed awards. That is to say, the region owner may also issue rewards of fixed amounts for participation in a variety of different single occasions or events. For example, the owner of the region if FIG. 2 may issue a fixed award of 5 $VU to each of the participants of avatars 250, 255, 260, and 265 for entering the range 240 of the event. The region owner may also issue another 5 $VU for attending the entire event, or staying within range 240 for a fixed period of time. The region owner may issue rewards to other participant who are not in range. For example, a participant controlling avatar 210 may receive a 25 $VU fixed award for completing a task or completing a survey, even though the avatar remains some distance 220 from the range 240 during the event.

In one or more embodiments, manual awards may be issued by the region owner for a variety of reasons. For example, a teacher may be the owner of avatar 230. The teacher may have her class, consisting of participants for avatars 250, 255, 260, and 265, participate in the event which comprises an exceptionally productive brainstorming session. The principal, which may be the region owner, may issue a manual award to the teacher for exceptional leadership during the event, as well as manual awards to the class participants for the development of innovative ideas.

As the discussion for FIG. 2 illustrates, various embodiments may create incentives for active avatars to visit and promote participation in virtual universe regions, yet still reward inactive avatars in such regions where they still provide an "attendance count". Embodiments employing such a reward systems may therefore have the effect of increasing attendance of active avatars, which may comprise readily available consumers, in regions where such a reward system is offered, and providing both enhanced earning potential to the avatars, the region owners, and/or the advertisers.

Figure 3A:
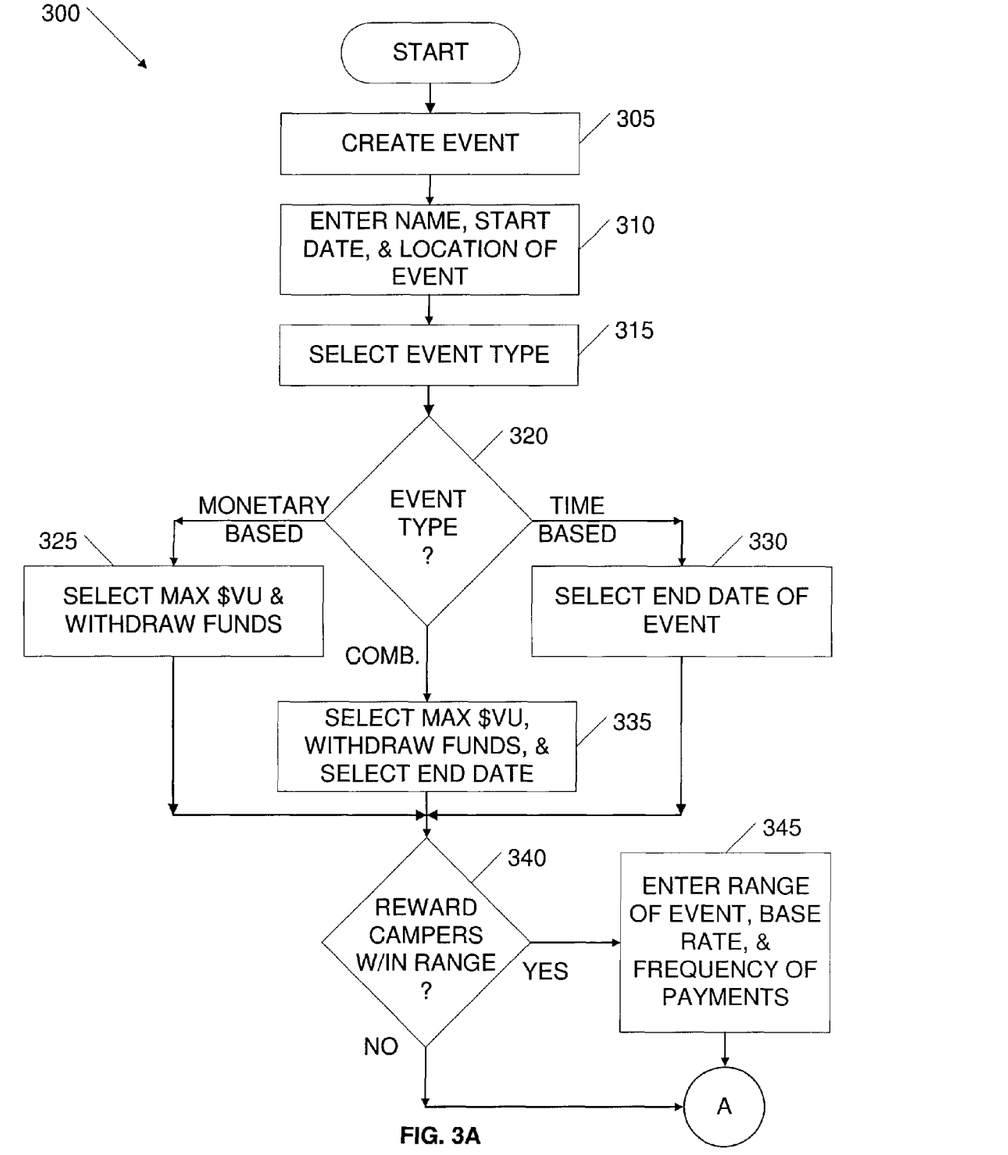
FIGS. 3A-3B depict a flowchart of an algorithm for defining compensation for participants of an event of a virtual environment.
Figure 3B:
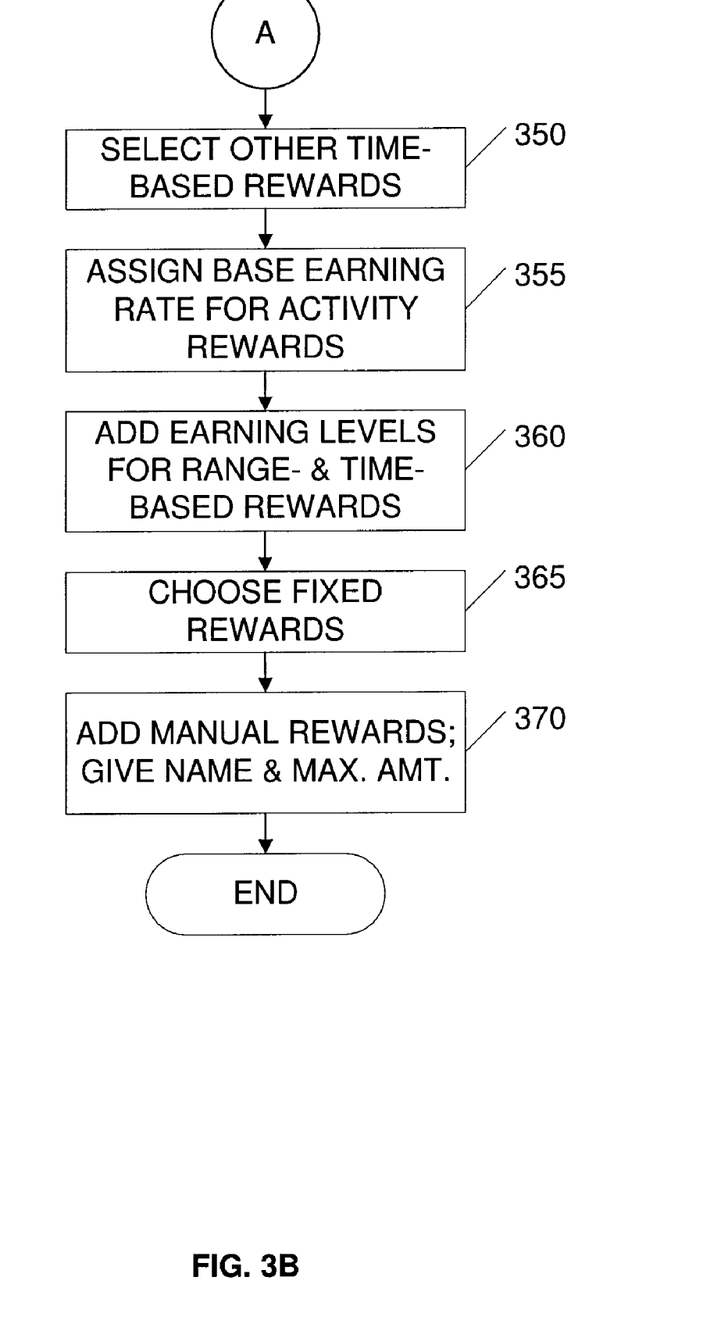

FIGS. 3A and 3B depict a flowchart 300 of an algorithm for defining compensation for participants of an event in a virtual environment. For example, one or more embodiments may be implemented as an administrative feature available to region owners in virtual environments, such as a virtual world. The administrative feature may comprise computer software that provides one of several administrative features available to a region owner of the virtual world when the region owner conducts activities related to the virtual world. Creating the event and creating incentives to entice participants to attend the event may comprise numerous configuration steps accomplished vie the administrative features.

The administrative feature may first allow the region owner to define or create an event (element 305), as well as create incentives for attendance and participation of the event. For example, a user interface of the virtual environment may consist of an administrative console available to the region owner, or person wanting to create the event. In one or more embodiments, the algorithm may allow the region owner to choose and reactivate a previously held event, as well as the previously defined incentives associated with the event. According to one or more software algorithms, the region owner may then assign a name to the event (element 310). In addition to selecting the name for the event, the region owner may also select a starting date and event location (element 310). For example, the region owner may make the meeting start on a Monday, two weeks away from the time the event is created, and define the location of the event by selecting a set of coordinate points which pinpoint a specific location within the virtual world.

Once the region owner enters the preliminary information for the event, the algorithm may allow the region owner to specify the compensation profile and the triggers to compensate participants. In so doing, the software algorithm may allow the region owner to select an event type (element 315). For example, the region owner may determine whether the event compensation is monetary-based, in other words based on units of virtual money, based on time, or based on a combination of both. The algorithm may define different actions, depending on the type of event chosen by the region owner (element 320). If the region owner chooses a monetary-based event type, the software may allow the region owner to enter a maximum $VU amount to be committed to the event, wherein the funds may be immediately withdrawn from an account of the region owner (element 325). In alternative embodiments, withdrawal of the funds may not occur until shortly before the event begins.

If the region owner instead chooses a time-based event type, the algorithm may require the region owner to enter the end date for the event (element 330). Alternatively, if the region owner chooses a combination event type, the algorithm may ask the region owner to specify a maximum $VU amount to be committed to the event, as well as the end date (element 335). The algorithm may withdraw the funds from an account of the region owner at the time the event is created or wait until shortly before the event begins.

The region owner may be able to specify whether campers within range of the event are to be rewarded (element 340). For example, the region owner may choose to reward all participants who have avatars in the region (avatars 205, 210, 230, 250, 255, 260, and 265) or reward only those that actually camp within range 240 (avatars 250, 255, 260, and 265). If the region owner chooses to only reward participants that camp within range (element 340), the software algorithm may allow the region owner to specify a range for the event, a base earning rate ($VU per unit time), and how frequently the payments are to be made (element 345). For example, the range amount may consist of a number of map coordinate units from the event location. The region owner may specify that payments should be calculated and given to the participants every five minutes, every fifteen minutes, every hour, etc.

One or more software algorithms may allow the region owner to select other time-based reward types for the region (element 350). For example, these time-based reward types may vary depending on the structure of the region. In other words, reward types may be related to activities that can be made available in the region. If the event is a dance or a party at a virtual nightclub, the region owner may want to compensate participants based on the number of people to which they introduce themselves. If the region has a virtual mall, the region owner may conduct a virtual fashion show and compensate the participants based on the number of clothing items for which the participants provide a rating, such as whether they like or dislike items of clothing in the virtual fashion show. If the event is a viewing of a virtual movie, which may be an initial screening of a movie about to be released for viewing in real-world theaters, the region owner may compensate participants who give a rating to the movie and provide comments. These activities and associated events are only a few examples.

For rewards based on activity, a software algorithm according to flowchart 300 may then allow the region owner to assign one or more base earning rates for the various activities (element 355). For range-based and time-based activity awards, the algorithm may allow the region owner to specify different earning levels (element 360). The software may also allow the region owner to specify triggers for each of the earning levels. Such triggers may be either time-based or fixed. For example, the algorithm may allow the region owner to specify a name for each triggering event, a type (time-based or fixed), a definition, and an amount. Definitions for the triggers may specify the event threshold which determines when a participant is entitled to a reward or earning rate. When a participant participates to an extent which crosses a triggering threshold, the participant may either receive a fixed award or a change in earning rate. In other words, earning levels may have triggers that determine when a participant qualifies for that level. Depending on the embodiment, triggers may be tripped by participants who spend a certain amount of time doing an activity, who come within range of the event, or who complete a task associated with the event. In some embodiments, triggers may comprise presenting a coupon to a region representative, referring other participants to the event, or sending a portal to the event for others.

One or more software algorithms may allow the region owner to add one or more fixed awards for an event (element 365). The region owner may specify each fixed award choosing a certain $VU amount. Additionally, the algorithm may allow the region owner to specify whether a fixed award is recurring or nonrecurring. The software may allow the region owner to further specify which activities are assigned to or otherwise associated with which fixed awards.

Upon adding fixed rewards, an algorithm may then allow the region owner to add manual awards for the event (element 370). In other words, the region owner may use the administrative console to enter a name and a maximum award amount for each manual award. At this time, one or more embodiments may allow the region owner to specify the names of one or more region representatives that will have permission to issue manual awards.

Figure 4:
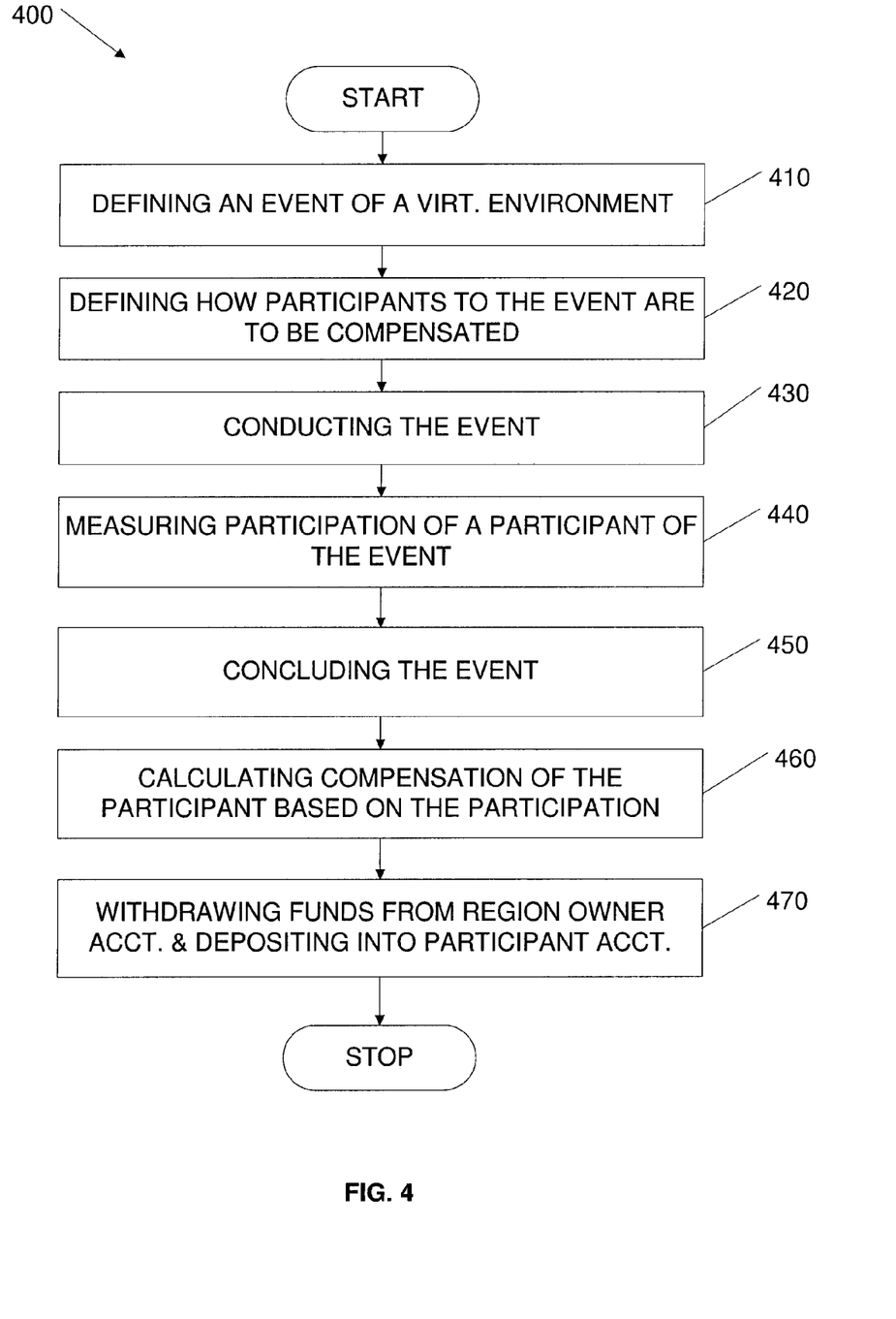
FIG. 4 illustrates an embodiment for a method to define, calculate, and transfer compensation for an event of a virtual environment.

FIG. 4 illustrates a flowchart 400 of a method to define, calculate, and transfer compensation for an event of a virtual environment. An embodiment according to flowchart 400 begins with defining an event of a virtual environment (element 410). For example, a user of an on-line virtual environment or an on-line game may purchase virtual real estate for the environment and create one or more virtual buildings on the real estate, such as a virtual store. The user, which may be an owner of a real-world store, may want to increase awareness of a new line of clothing. In defining an event for the virtual environment, the store owner may hold a virtual sale or a virtual fashion show, in hopes of exposing other users of the virtual environment to the new clothing line.

An embodiment of flowchart 400 continues by defining how participants that attend the event are compensated (element 420). Continuing with our previous example, the store owner may want to have $10,000.00, in units of virtual environment dollars which may only correspond to $200.00 real-world dollars of U.S. currency, paid to participants of the event. Using a virtual console to configure various parameters for the event, the store owner may specify that the event end whenever the funds have been exhausted or within two weeks after the event begins, whichever occurs first. The store owner may further specify that participants to the event, which again may be a virtual fashion show, receive $5 VU for each 15 minutes that they spend viewing different articles of clothing, up to a maximum amount of $20 VU. Additionally, the store owner may specify that each participant that views the fashion show for 30 minutes without being away from the keyboard receive an additional $10 VU. Even further, the store owner may use the virtual console to specify that participants who cause other avatars to teleport to the virtual fashion show event receive and additional $3 VU. For each participant that teleports to the event because of a referral and stays for 30 minutes or longer, the store owner may also specify that the referring participant receive an additional reward of $10. Again, the compensation decisions cited are examples only. Different methods and different scenarios will involve different events and different compensation to the participants.

Once the date for which the event is configured to take place arrives, the virtual environment system may initiate the event (element 430). For instance, the store owner may have designated at the virtual fashion show was to begin on the first Monday of the following month and end whenever the virtual funds set aside for the event were exhausted. A method according to flowchart 400 may proceed by measuring participation of each of the participants to the event (element 440). The virtual environment system may have initiated activities to occur at the event, such as a preprogrammed sequence of various clothes being displayed by virtual models walking down a catwalk. While the event is being held, the virtual environment may track or record activities for each of the participants to the event, how long each of the participants stayed at the event, how many referrals each of the dissidents made, and whether or not the participants were away from their keyboards during their attendances.

An embodiment of flowchart 400 continues by concluding the event (element 450). For example, the virtual environment may determine that the virtual fashion show has been held for two weeks and that the store owner still has $1,685.00 VU remaining in her account, after monitoring the participation of the various participants to the virtual fashion show and rewarding them or their participation (element 460). Since the time set for ending the event arrives before the funds have been exhausted the virtual environment program may conclude the event.

One or more embodiments according to flowchart 400 may withdraw the funds from the account of the store owner and deposit those funds into the accounts of the participants (element 470). As noted above, the virtual environment program may have monitored the participation by numerous participants that attended the virtual fashion show. Depending on how long they stay, as well as the types of activities in which they engaged while at the virtual fashion show, the virtual environment program may calculate the amounts of their rewards and transfer funds out of the store owner account and into the accounts of each of the participants as they become due or once the event ends.

As alluded to earlier, one or more embodiments may be implemented as a program product for use with a system to compensate participants of events or activities of virtual environments in accordance with, e.g., an algorithm for flowchart 300 shown in FIG. 3. or a program implementing a method according to the flowchart 400 in FIG. 4. The program(s) of the program product may define functions of the embodiments (including the methods described herein) and can be contained on a variety of data storage media. Illustrative data storage media include, but are not limited to: (i) non-writable storage media (e.g., read-only memory devices within a computer such as CD-ROM disks readable by a CD-ROM drive); and (ii) writable storage media (e.g., floppy disks within a diskette drive or hard-disk drive). Such data storage media, when storing computer-readable instructions that direct the functions of calendaring or time management applications, represent one or more embodiments.

In general, the routines executed to implement the embodiments, may be part of an operating system or a specific application, component, program, module, object, or sequence of instructions. The computer program of the one or more embodiments may comprise a multitude of instructions that will be translated by a computer into a machine-readable format and hence executable instructions. Also, the programs may comprise variables and data structures that either reside locally to the program or are found in memory or on storage devices. In addition, various programs described hereinafter may be identified based upon the application for which they are implemented in a specific embodiment of the invention. However, it should be appreciated that any particular program nomenclature described is used merely for convenience, and thus the specific embodiments should not be limited to use solely in any specific application identified and/or implied by such nomenclature.

It will be apparent to those skilled in the art having the benefit of this disclosure that the present invention contemplates methods, systems, and program products for compensating participants of events and/or activities of virtual environments. It is understood that the forms of the embodiments shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising the steps of:
   a computer conducting a plurality of virtual games within a virtual environment;
   the computer measuring at least one factor of a plurality of factors of participation in a virtual game of the plurality of virtual games by a participant of the virtual environment controlling a virtual game player avatar graphically displayed in a human form in the virtual environment, the plurality of factors including a virtual distance that the virtual game player avatar is to a location of the virtual game in the virtual environment, an amount of time that the virtual game player avatar spends at the virtual game, an amount of time that the participant spends away from a keyboard of the participant during the virtual game, a number of referrals made by the participant that result in another participant of the virtual environment participating in the virtual game, a number of acceptances of offers made by the participant to teleport a virtual game player avatar controlled by another participant of the virtual environment to the virtual game, and an amount of time spent in chat activity by the participant during the virtual game; and the computer calculating an amount of virtual money to transfer from a virtual account in the virtual environment belonging to a creator of the virtual game to a virtual account in the virtual environment belonging to the participant based upon said measured at least one factor.

2. The method of claim 1, further comprising the step of:
the computer transferring the calculated amount of virtual money from the virtual account belonging to the creator of the virtual game to the virtual account belonging to the participant.

3. The method of claim 2, further comprising the steps of:
the computer interacting with a computer that maintains information of a real bank account of the participant; and
the computer converting the transferred amount of virtual money into an amount of an amount of real money.

4. The method of claim 1, wherein the at least one factor includes the amount of time that the participant spends away from the keyboard of the participant during the virtual game.

5. The method of claim 1, wherein the at least one factor includes the amount of time spent in chat activity by the participant during the virtual game.

6. The method of claim 1, wherein the at least one factor includes the number of referrals made by the participant that result in another participant of the virtual environment participating in the virtual game.

7. A computer system comprising:
a processor, a computer-readable memory, and a computer-readable tangible storage device:
program instructions, stored on the computer-readable tangible storage device for execution by the processor via the computer-readable memory, to conduct a plurality of virtual games within a virtual environment;
program instructions, stored on the computer-readable tangible storage device for execution by the processor via the computer-readable memory, to measure at least one factor of a plurality of factors of participation in a virtual game of the plurality of virtual games by a participant of the virtual environment controlling a virtual game player avatar graphically displayed in human form in the virtual environment, the plurality of factors including a virtual distance that the virtual game player avatar is to a location of the virtual game in the virtual environment, an amount of time that the virtual game player avatar spends at the virtual game, an amount of time that the participant spends away from a keyboard of the participant during the virtual game, a number of referrals made by the participant that result in another participant of the virtual environment participating in the virtual game, a number of acceptances of offers made by the participant to teleport a virtual game player avatar controlled by another participant of the virtual environment to the virtual game, and an amount of time spent in chat activity by the participant during the virtual game; and
program instructions, stored on the computer-readable tangible storage device for execution by the processor via the computer-readable memory, to calculate an amount of virtual money to transfer from a virtual account in the virtual environment belonging to a creator of the virtual game to a virtual account in the virtual environment belonging to the participant based upon said measured at least one factor.

8. The computer system of claim 7, wherein the computer system hosts the plurality of virtual games on a server in communication with a plurality of client computing devices via a communication network.

9. The computer system of claim 7, further comprising:
program instructions, stored on the computer-readable tangible storage device for execution by the processor via the computer-readable memory, to transfer the calculated amount of virtual money from the virtual account belonging to the creator of the virtual game to the virtual account belonging to the participant.

10. The computer system of claim 9, further comprising:
program instructions, stored on the computer-readable tangible storage device for execution by the processor via the computer-readable memory, to interact with a computer that maintains information of a real bank account of the participant; and
program instructions, stored on the computer-readable tangible storage device for execution by the processor via the computer-readable memory, to convert the transferred amount of virtual money into an amount of real money.

11. The computer system of claim 7, further comprising program instructions, stored on the computer-readable tangible storage device for execution by the processor via the computer-readable memory, to end said virtual game based on at least one of: an amount of virtual money designated by the creator of the virtual game, an amount of time designated for the virtual game, and a combination of the amount of virtual money designated by the creator and the amount of time designated for the virtual game.

12. The computer system of claim 7, wherein the program instructions to calculate the amount of virtual money to transfer from the virtual account belonging to the creator of the virtual game to the virtual account belonging to the participant calculate part of the amount of virtual money based upon a manual designation by the creator of said virtual game.

13. The computer system of claim 7, wherein the program instructions to calculate the amount of virtual money to transfer from the virtual account belonging to the creator of the virtual game to the virtual account belonging to the participant calculate the amount of virtual money by multiplying an amount of time the participant spends attending said virtual game by a base earning rate, wherein the base earning rate is in units of virtual money per unit of time.

14. A computer program product comprising:
a computer-readable tangible storage device;
program instructions, stored on the computer-readable tangible storage device, to conduct a plurality of virtual games within a virtual environment;
program instructions, stored on the computer-readable tangible storage device, to measure at least one factor of a plurality of factors of participation in a virtual game of the plurality of virtual games by a participant of the virtual environment controlling a virtual game player avatar graphically displayed in human form in the virtual environment, the plurality of factors including a virtual distance that the virtual game player avatar is to a location of the virtual game in the virtual environment, an amount of time that the virtual game player avatar spends at the virtual game, an amount of time that the participant spends away from a keyboard of the participant during the virtual game, a number of referrals made by the participant that result in another participant of the virtual environment participating in the virtual game, a number of acceptances of offers made by the participant to teleport a virtual game player avatar controlled by another participant of the virtual environment to the virtual game, and an amount of time spent in chat activity by the participant during the virtual game; and program instructions, stored on the computer-readable tangible storage device, to calculate an amount of virtual money to transfer from a virtual account in the virtual environment belonging to a creator of the virtual game to a virtual account in the virtual environment belonging to the participant based upon the measured at least one factor.

15. The computer program product of claim 14, further comprising program instructions, stored on the computer-readable tangible storage device, to create the virtual game, wherein the program instructions to create the virtual game create the virtual game such that the virtual game will conclude upon at least one of an expiration of an amount of time and a depletion of a quantity of funds.

16. The computer program product of claim 14, further comprising program instructions, stored on the computer-readable tangible storage device, to transfer the calculated amount of virtual money from the virtual account belonging to the creator of the virtual game to the virtual account belonging to the participant.

17. The computer program product of claim 14, wherein the program instructions comprise to conduct the plurality of virtual games conduct the virtual game in a region of a virtual world.

18. The computer program product of claim 17, further comprising program instructions, stored on the computer-readable tangible storage device, to calculate the virtual distance that the virtual game player avatar is to the location of the virtual game in the virtual environment via coordinates of a virtual map for the region.

19. The computer program product of claim 14, wherein the at least one factor includes the amount of time that the virtual game player avatar spends at the virtual game.

20. The computer program product of claim 14, further comprising program instructions, stored on the computer-readable tangible storage device, to add a manual award to the calculated amount of virtual money.

\* \* \* \* \*